(12) United States Patent
Kawamoto et al.

(10) Patent No.: US 8,668,801 B2
(45) Date of Patent: Mar. 11, 2014

(54) METHOD OF PRODUCING A LAMINATED OPTICAL FILM

(75) Inventors: Ikuo Kawamoto, Ibaraki (JP);
Masatoshi Tomonaga, Ibaraki (JP);
Yuuji Saiki, Ibaraki (JP)

(73) Assignee: Nitto Denko Corporation, Ibaraki-shi (JP)

(*) Notice: Subject to any disclaimer, the term of this patent is extended or adjusted under 35 U.S.C. 154(b) by 386 days.

(21) Appl. No.: 12/986,527

(22) Filed: Jan. 7, 2011

(65) Prior Publication Data

US 2011/0222262 A1 Sep. 15, 2011

Related U.S. Application Data

(60) Provisional application No. 61/293,403, filed on Jan. 8, 2010.

(51) Int. Cl.
*B29C 65/00* (2006.01)
*B32B 37/00* (2006.01)
*B32B 38/04* (2006.01)

(52) U.S. Cl.
USPC ........ 156/256; 156/265; 156/229; 156/272.8; 156/299

(58) Field of Classification Search
USPC ......... 156/256, 252, 265, 101, 102, 229, 248, 156/272.8, 299
See application file for complete search history.

(56) References Cited

U.S. PATENT DOCUMENTS

| | | | |
|---|---|---|---|
| 5,956,001 A | 9/1999 | Sumida et al. | |
| 7,110,073 B2* | 9/2006 | Hsu et al. | 349/119 |
| 7,294,303 B2* | 11/2007 | Fukuoka et al. | 264/494 |
| 7,494,223 B2* | 2/2009 | Inamoto | 353/20 |
| 7,852,561 B2* | 12/2010 | Chiba et al. | 359/489.15 |

FOREIGN PATENT DOCUMENTS

JP 9-304740 A 11/1997

* cited by examiner

*Primary Examiner* — Linda Gray

(74) *Attorney, Agent, or Firm* — Westerman, Hattori, Daniels & Adrian, LLP

(57) ABSTRACT

A method for producing a laminated optical film that allows three-dimensional images to be reproduced, which is preferably used in a large image display apparatus. One embodiment of the method includes laminating a polarizing plate and a λ/4 plate and forming a λ/2 layer partially on the λ/4 plate. The polarizing plate and the λ/4 plate are laminated such that an angle between an absorption axis of a polarizer of the polarizing plate and a slow axis of the λ/4 plate is substantially 45°, and the λ/2 layer is formed such that an angle between the absorption axis of the polarizer and a slow axis of the λ/2 layer is substantially 45°.

7 Claims, 2 Drawing Sheets

METHOD OF PRODUCING A LAMINATED OPTICAL FILM

BACKGROUND OF THE INVENTION

1. Technical Field

The present invention relates to a method of producing a laminated optical film used for an image display apparatus.

2. Background Art

In recent years, liquid crystal display apparatuses and plasma display apparatuses of 65 inches or less are rapidly spreading for household use, and there is a demand for an image display apparatus capable of displaying a more real image. Under this circumstance, it has been proposed to reproduce a three-dimensional image with a liquid crystal display apparatus, using polarizing spectacles. For example, Patent Document 1 (Japanese Patent Application Laid-open No. 9-304740) proposes that circularly polarized light areas different between the left and right sides are formed using retardation plates and cylindrical lenses respectively corresponding to a right-eye pixel group and a left-eye pixel group. Such an image display apparatus includes pixels of the order of micrometers, and hence, it has been proposed that a retardation plate be formed, for example, by a photolithography process.

Recently, the number of indoor and outdoor amusement facilities for enjoying large screens is increasing. An LED display apparatus of 100 inches or more, for example, is used outdoors so that a large number of people can enjoy. Then, it is desired that three-dimensional images be reproduced with such a large image display apparatus.

SUMMARY OF THE INVENTION

The present invention has been made in view of solving the above-mentioned conventional problems, and a main object of the present invention is to provide a method of producing a laminated optical film that allows three-dimensional images to be reproduced, which is preferably used, particularly, in a large image display apparatus.

According to one aspect of the present invention, a method of producing a laminated optical film is provided. The method of producing a laminated optical film includes laminating a polarizing plate and a λ/4 plate and forming a λ/2 layer partially on the λ/4 plate. The polarizing plate and the λ/4 plate are laminated so that an angle between an absorption axis of a polarizer of the polarizing plate and a slow axis of the λ/4 plate is substantially 45°, and the λ/2 layer is formed so that an angle between the absorption axis of the polarizer and a slow axis of the λ/2 layer is substantially 45°.

In one preferred embodiment of the present invention, the λ/2 layer is formed by a plurality of λ/2 plates.

In another preferred embodiment of the present invention, the λ/2 layer is formed by a λ/2 plate having a pattern.

In still another preferred embodiment of the present invention, the pattern is formed by punching a λ/2 plate with a Thomson blade.

In still another preferred embodiment of the present invention, the pattern is formed through irradiation of laser light.

In still another preferred embodiment of the present invention, the λ/4 plate has an in-plane retardation Δnd of 95 nm to 180 nm, and the λ/2 layer has an in-plane retardation Δnd of 190 nm to 360 nm.

In still another preferred embodiment of the present invention, the λ/2 layer is formed in a stripe shape.

In still another preferred embodiment of the present invention, a non-covered portion that is not covered with the λ/2 layer is formed in a substantially circular shape.

According to another aspect of the present invention, an LED display apparatus is provided. The LED display apparatus includes the laminated optical film produced by the production method.

In one preferred embodiment of the present invention, the LED display apparatus has a screen size of 10 inches or more.

In another preferred embodiment of the present invention, the LED display apparatus has a screen size of 50 inches or more.

In still another preferred embodiment of the present invention, the LED display apparatus has a screen size of 100 inches or more.

A laminated optical film obtained in the present invention is preferably used, particularly, in a large image display apparatus and allows three-dimensional images to be reproduced satisfactorily.

DETAILED DESCRIPTION OF THE INVENTION

Hereinafter, preferred embodiments of the present invention are described with reference to drawings. It should be noted that the present invention is not limited to these specific embodiments.

Definitions of Terms and Symbols

The definitions of terms and symbols used herein are as described below.

(1) The symbol "nx" refers to a refractive index in a direction in which an in-plane refractive index becomes maximum (i.e., a slow axis direction), the symbol "ny" refers to a refractive index in a direction perpendicular to a slow axis in a plane (i.e., a fast axis direction), and the symbol "nz" refers to a refractive index in a thickness direction.

(2) The term "in-plane retardation Δnd" refers to an in-plane retardation value of a layer (film) measured at 23° C. by using light of a wavelength of 590 nm. Δnd can be determined from an equation: $\Delta nd = (nx - ny) \times d$, where nx and ny represent refractive indices of a layer (film) at a wavelength of 590 nm in a slow axis direction and a fast axis direction, respectively, and d (nm) represents a thickness of the layer (film).

A. Laminated Optical Film

Figure 1:
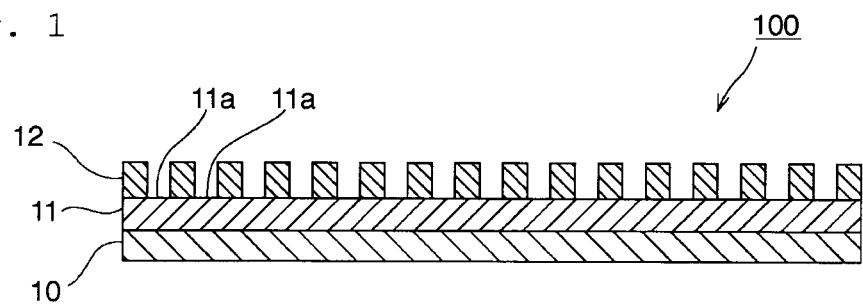
FIG. 1 A cross-sectional view of a laminated optical film according to a preferred embodiment of the present invention.
Figure 2:
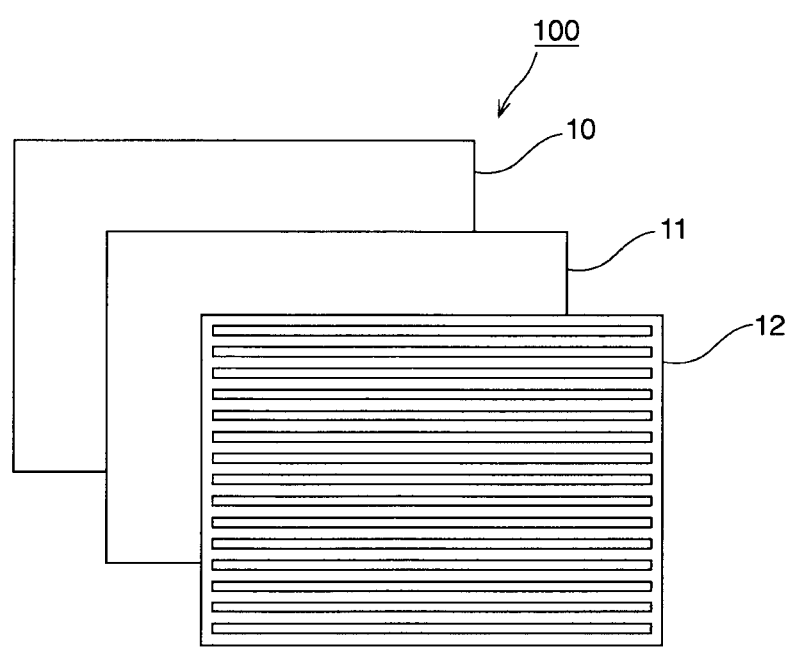
FIG. 2 An exploded plan view of the laminated optical film illustrated in FIG. 1.

FIG. 1 is a cross-sectional view of a laminated optical film 100 according to a preferred embodiment of the present invention. FIG. 2 is an exploded plan view thereof. The laminated optical film 100 includes a polarizing plate 10, a λ/4 plate 11, and a λ/2 layer 12 in this order. The λ/2 layer 12 is partially formed on the λ/4 plate. In other words, the λ/4 plate 11 is partially covered with the λ/2 layer 12. In the illustrated example, the λ/2 layer 12 is formed in a stripe shape at a substantially constant interval, and non-covered portions 11a which are not covered with the λ/2 layer 12 are formed in a slit shape. Thus, the λ/2 layer is preferably formed uniformly on the λ/4 plate.

The width of the slit-shaped non-covered portion 11a and the interval between the adjacent non-covered portions 11a, 11a are set to be any suitable values depending upon the size, pixels, and the like of an image display apparatus to which the laminated optical film 100 is to be applied. The width of the non-covered portion is preferably 2 mm to 200 mm. The interval between the adjacent non-covered portions is preferably 2 mm to 200 mm. Although the slit-shaped non-covered portions are formed along a horizontal direction in the illustrated example, they may be formed along a vertical direction or along an oblique direction.

Figure 3:
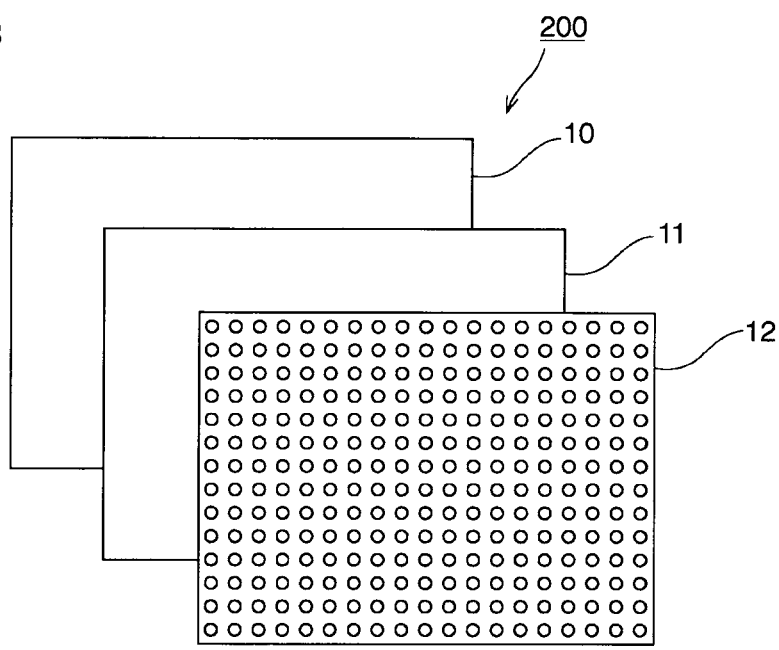
FIG. 3 An exploded plan view of a laminated optical film according to another preferred embodiment of the present invention.

FIG. 3 is an exploded plan view of a laminated optical film 200 according to another preferred embodiment. In this embodiment, non-covered portions which are not covered with the λ/2 layer 12 are formed in a substantially circular shape, and formed uniformly along vertical and horizontal directions at a substantially constant interval. The diameter of the substantially circular non-covered portion and the interval between the adjacent non-covered portions are set to be any suitable values depending upon the size, pixels, and the like of an image display apparatus to which the laminated optical film 200 is to be applied. The diameter of the non-covered portion is, for example, 0.5 mm to 50 mm corresponding to a pixel of the image display apparatus. In one embodiment, the interval between the adjacent non-covered portions is 1 mm to 100 mm in the vertical direction and 2 mm to 200 mm in the horizontal direction. In another embodiment, the interval is 0.5 mm to 50 mm in the vertical direction and 2 mm to 200 mm in the horizontal direction. The pixels of a large image display apparatus are generally of the order of millimeters or centimeters.

The covering ratio of the λ/4 plate by the λ/2 layer is preferably 20% to 95%, more preferably 30% to 90%.

The λ/4 plate is laminated so that an angle formed between a slow axis thereof and an absorption axis of a polarizer of the polarizing plate may be substantially 45°. Further, the λ/2 layer is laminated so that an angle formed between a slow axis thereof and an absorption axis of the polarizer of the polarizing plate may be substantially 45°. Herein, the phrase "substantially 45°" includes the case where the angle is 45°±3.0°, and the angle is preferably 45°±1.0°, more preferably 45°±0.5°.

An angle formed between the slow axis of the λ/4 plate and the slow axis of the λ/2 layer is not particularly limited. Specifically, the slow axis of the λ/4 plate and the slow axis of the λ/2 layer are substantially perpendicular or substantially parallel to each other. Particularly preferably, the slow axis of the λ/4 plate and the slow axis of the λ/2 layer are substantially perpendicular to each other. As used herein, the phrase "substantially perpendicular" includes the case where the angle is 90°±3.0°, and the angle is preferably 90°±1.0°, more preferably 90°±0.5°. The phrase "substantially parallel" includes the case where the angle is 0°±3.0°, and the angle is preferably 0°±1.0°, more preferably 0°±0.5°.

A-1. Polarizing Plate

A polarizing plate has at least a polarizer, and practically, includes a polarizer and a protective film placed on at least one side of the polarizer. The polarizer and the protective film are laminated via any suitable adhesive or pressure-sensitive adhesive.

Any appropriate polarizer is used as the polarizer. Examples thereof include: a film prepared by causing a hydrophilic polymer film such as a polyvinyl alcohol-based film, a partially formalized polyvinyl alcohol-based film, or a partially saponified ethylene/vinyl acetate copolymer-based film to adsorb a dichromatic substance such as iodine or a dichromatic dye and uniaxially stretching the film; and a polyene-based aligned film such as a dehydrated product of a polyvinyl alcohol or a dehydrochlorinated product of a polyvinyl chloride. Of those, a polarizer prepared by causing a polyvinyl alcohol-based film to adsorb a dichromatic substance such as iodine and uniaxially stretching the film is particularly preferred because of high polarized dichromaticity. A thickness of the polarizer is preferably 0.5 to 80 μm.

The polarizer prepared by causing a polyvinyl alcohol-based film to adsorb iodine and uniaxially stretching the film is typically formed by: immersing a polyvinyl alcohol in an aqueous solution of iodine for coloring; and stretching the film so that the film may be 3 to 7 times as long as the original length. The polyvinyl alcohol-based film may be stretched after coloring, while coloring, or before coloring. In addition to streching and coloring, the polarizer is formed by performing processes such as swelling, cross-linking, adjusting, washing, and drying.

Any appropriate film which can be used as a protective film of a polarizer can be used as the protective film. A material to be included as a main component of the film is specifically, for example, a cellulose-based resin such as triacetyl cellulose (TAC), or a transparent resin such as a (meth)acrylic resin, a polyester-based resin, a polyvinyl alcohol-based resin, a polycarbonate-based resin, a polyamide-based resin, a polyimide-based resin, a polyethersulfone-based resin, a polysulfone-based resin, a polystyrene-based resin, a polynorbornene-based resin, a polyolefin-based resin, or an acetate-based resin. A thermosetting resin or UV-curable resin such as an acrylic resin, a urethane-based resin, an acrylurethane-based resin, an epoxy-based resin, or a silicone-based resin is also permitted. In addition to the foregoing, a glassy polymer such as a siloxane-based polymer is also permitted. Further, a polymer film described in Japanese Patent Application Laid-open No. 2001-343529 (WO 01/37007) may also be used. For example, a resin composition containing a thermoplastic resin having a substituted or unsubstituted imide group on a side chain, and a thermoplastic resin having a substituted or unsubstituted phenyl group and nitrile group on side chains can be used as a material for the film. The resin composition is, for example, a resin composition containing an alternating isobutene/N-methylmaleimide copolymer, and an acrylonitrile/styrene copolymer. The above-mentioned polymer film may be an extrusion molded product of the resin composition, for example.

A-2. λ/4 Plate

The λ/4 plate has an in-plane retardation Δnd of preferably 95 nm to 180 nm, more preferably 110 nm to 160 nm. The λ/4 plate can convert linearly polarized light having a certain wavelength into circularly polarized light (or circularly polarized light into linearly polarized light). The λ/4 plate preferably has a refractive index ellipsoid of nx>ny≥nz. As used herein, the phrase "ny=nz" includes not only the case where ny and nz are completely equal to each other but also the case where ny and nz are substantially equal to each other.

The λ/4 plate is preferably a stretched film of a polymer film. Specifically, by appropriately selecting the kind of a polymer and a stretching treatment (for example, a stretching method, a stretching temperature, a stretching ratio, or a stretching direction), a λ/4 plate is obtained.

Any suitable resin is used as the resin forming the polymer film described above. Specific examples of the resin include resins constituting positive birefringence films, such as a norbornene-based resin, polycarbonate-based resin, cellulose-based resin, polyvinyl alcohol-based resin, and polysulphone-based resin. Of those, the norbornene-based resin and polycarbonate-based resin are preferred.

The above-mentioned norbornene-based resin is a resin obtained by polymerizing a norbornene-based monomer as a polymerization unit. Examples of the norbornene-based monomer include: norbornene, alkyl- and/or alkylidene-substituted products thereof such as 5-methyl-2-norbornene, 5-dimethyl-2-norbornene, 5-ethyl-2-norbornene, 5-butyl-2-norbornene, and 5-ethylidene-2-norbornene, and substituted products thereof with polar groups such as a halogen; dicyclopentadiene and 2,3-dihydrodicyclopentadiene; dimethanooctahydronaphthalene, alkyl- and/or alkylidene-substituted products thereof, and substituted products thereof with polar groups such as a halogen including
6-methyl-1,4:5,8-dimethano-1,4,4a,5,6,7,8,8a-octahydronaphthal ene,
6-ethyl-1,4:5,8-dimethano-1,4,4a,5,6,7,8,8a-octahydronaphthale ne,
6-ethylidene-1,4:5,8-dimethano-1,4,4a,5,6,7,8,8a-octahydronaph thalene,
6-chloro-1,4:5,8-dimethano-1,4,4a,5,6,7,8,8a-octahydronaphthal ene,
6-cyano-1,4:5,8-dimethano-1,4,4a,5,6,7,8,8a-octahydronaphthale ne,
6-pyridyl-1,4:5,8-dimethano-1,4,4a,5,6,7,8,8a-octahydronaphtha lene, and
6-methoxycarbonyl-1,4:5,8-dimethano-1,4,4a,5,6,7,8,8a-octahydr onaphthalene; a trimer and a tetramer of cyclopentadiene such as 4,9:5,8-dimethano-3a,4,4a,5,8,8a,9,9a-octahydro-1H-benzoindene and 4, 11:5, 10:6,9-trimethano-3a,4,4a,5,5a,6,9,9a,10,10a,11,11a-dod ecahydro-1H-cyclopentaanthracene. The above-mentioned norbornene-based resin may be a copolymer of a norbornene-based monomer and another monomer.

An aromatic polycarbonate is preferably used as the above-mentioned polycarbonate-based resin. The aromatic polycarbonate can be typically obtained by a reaction between a carbonate precursor substance and an aromatic dihydric phenol compounds. Specific examples of the carbonate precursor substance include phosgene, and dihydric phenols such as bischloroformate, diphenylcarbonate, di-p-tolylcarbonate, phenyl-p-tolylcarbonate, di-p-chlorophenylcarbonate, and dinaphthylcarbonate. Of those, phosgene and a diphenylcarbonate are preferred. Specific examples of the aromatic dihydric phenol compound include
2,2-bis(4-hydroxyphenyl)propane,
2,2-bis(4-hydroxy-3,5-dimethylphenyl)propane,
bis(4-hydroxyphenyl)methane, 1,1-bis-(4-hydroxyphenyl) ethane,
2,2-bis(4-hydroxyphenyl)butane,
2,2-bis(4-hydroxy-3,5-dimethylphenyl)butane,
2,2-bis(4-hydroxy-3,5-dipropylphenyl)propane,
1,1-bis(4-hydroxyphenyl)cyclohexane, and
1,1-bis(4-hydroxyphenyl)-3,3,5-trimethylcyclohexane. They may be used alone or in combination. Preferably,
2,2-bis(4-hydroxyphenyl)propane,
1,1-bis(4-hydroxyphenyl)cyclohexane, and
1,1-bis(4-hydroxyphenyl)-3,3,5-trimethylcyclohexane are used. Particularly preferably, 2,2-bis(4-hydroxyphenyl) propane and 1,1-bis(4-hydroxyphenyl)-3,3,5-trimethylcyclohexane are used in combination.

A stretching method is, for example, lateral uniaxial stretching, fixed-end biaxial stretching, or sequential biaxial stretching. A specific example of the fixed-end biaxial stretching is a method involving stretching a polymer film in a short direction (lateral direction) while allowing the polymer film to run in a lengthwise direction. This method can be apparently lateral uniaxial stretching. Further, oblique stretching can also be adopted. By adopting oblique stretching, a long stretched film having an alignment axis (slow axis) at a predetermined angle with respect to a widthwise direction can be obtained.

The thickness of the stretched film is typically 5 to 80 μm, preferably 15 to 60 μm, and more preferably 25 to 45 μm.

A-3. $\lambda/2$ Layer

The $\lambda/2$ layer has an in-plane retardation $\Delta nd$ of preferably 190 nm to 360 nm, more preferably 220 nm to 330 nm. The $\lambda/2$ layer can convert linearly polarized light having a particular vibration direction into linearly polarized light having a vibration direction perpendicular to the vibration direction of the linearly polarized light, and right circularly polarized light into left circularly polarized light (or left circularly polarized light into right circularly polarized light). The $\lambda/2$ layer preferably has a refractive index ellipsoid of $nx>ny\geq nz$.

The $\lambda/2$ layer is preferably a stretched film of a polymer film in the same way as in the $\lambda/4$ plate. The detail is as described in the section A-2.

B. Production Method

The laminated optical film of the present invention is produced by laminating a polarizing plate and a $\lambda/4$ plate, and forming a $\lambda/2$ layer partially on the $\lambda/4$ plate. Herein, the polarizing plate and the $\lambda/4$ plate are laminated so that an angle formed between an absorption axis of a polarizer of the polarizing plate and a slow axis of the $\lambda/4$ plate may be substantially 45°, and the $\lambda/2$ layer is formed on the $\lambda/4$ plate so that an angle formed between the absorption axis of the polarizer and a slow axis of the $\lambda/2$ layer may be substantially 45°.

Each layer is laminated typically via any suitable pressure-sensitive adhesive layer or adhesive layer. An acrylic pressure-sensitive adhesive is preferably used as a pressure-sensitive adhesive forming the pressure-sensitive adhesive layer. The thickness of the pressure-sensitive adhesive layer is preferably 4 to 30 μm, and the thickness of the adhesive layer is preferably 1 to 10 μm.

The $\lambda/2$ layer is formed partially on the $\lambda/4$ plate. Any suitable method is adopted as a method of forming the $\lambda/2$ layer partially on the $\lambda/4$ plate. In one embodiment, there is a method involving laminating the $\lambda/2$ plate with a pattern formed thereon on the $\lambda/4$ plate. A method of forming the pattern is, for example, a method involving punching the $\lambda/2$ plate with a Thomson blade so that a predetermined pattern may be formed, or a method involving irradiating the $\lambda/2$ plate with laser light (for example, $CO_2$ laser) so that a predetermined pattern may be formed. Those methods do not use special chemical agents, and hence, neither influence nor degrade the optical properties of the $\lambda/2$ plate. A cut-off caused by the Thomson blade or laser light irradiation is removed by, for example, spraying and/or suction.

Then, the $\lambda/2$ plate with a predetermined pattern formed thereon is laminated on the $\lambda/4$ plate via any suitable pressure-sensitive adhesive layer or adhesive layer. It is preferred that the pressure-sensitive adhesive layer or adhesive layer be formed on the $\lambda/2$ plate previously.

In another embodiment, a $\lambda/2$ layer is formed by laminating a plurality of $\lambda/2$ plates on a $\lambda/4$ plate via a pressure-sensitive adhesive layer or adhesive layer. The plurality of $\lambda/2$ plates are respectively designed in any suitable shape, as long as the $\lambda/2$ layer having a predetermined pattern is formed.

After the polarizing plate, the $\lambda/4$ plate, and the $\lambda/2$ plate have been laminated, unnecessary sites may be removed by cutting.

C. Use

The laminated optical film of the present invention finds use in image display apparatuses, and three-dimensional images (stereographic images) can be reproduced using polarizing spectacles. The laminated optical film of the present invention is used preferably in an LED display apparatus out of the image display apparatuses.

Spectacles having circular polarization in which polarization directions are opposite between a left-eye region and a right-eye region are preferably used as the polarizing spectacles. A specific example includes polarizing spectacles having a laminate of a polarizing plate and a λ/4 plate, in which the λ/4 plate is laminated so as to form different angles with respect to an absorption axis of the polarizing plate (polarizer) between the left-eye region and the right-eye region. An angle formed between the absorption axis of the polarizing plate (polarizer) and the slow axis of the λ/4 plate is preferably substantially 45°. The slow axis of the λ/4 plate in the left-eye region and the slow axis of the λ/4 plate in the right-eye region are preferably substantially perpendicular to each other.

The laminated optical film of the present invention can be used for an image display apparatus having a screen size of preferably 10 inches or more, more preferably 50 inches or more, and particularly preferably 100 inches or more.

EXAMPLES

Hereinafter, the present invention is described specifically by way of examples. However, the present invention is not limited to those examples.

Example 1

(λ/4 Plate)

A polycarbonate retardation plate (NRF-R138 (trade name) produced by Nitto Denko Corporation) was used as a λ/4 plate. The retardation plate had a thickness of 60 μm and an in-plane retardation Δnd of 137.5 nm.

(λ/2 Plate)

A polycarbonate retardation plate (NRF-R280 (trade name) produced by Nitto Denko Corporation) was used as a λ/2 plate. The retardation plate had a thickness of 60 μm and an in-plane retardation Δnd of 275 nm.

(Formation of a Pattern)

As illustrated in FIGS. 1 and 2, a λ/2 plate (191 mm long and 384 mm wide) was punched with a blade so that slits each having a width of 6 mm might be formed at an interval of 6 mm. Thus, a pattern was formed.

(Production of a Laminated Optical Film)

A polarizing plate (SEG5425DU (trade name) produced by Nitto Denko Corporation) and a λ/4 plate were laminated via an acrylic pressure-sensitive adhesive (thickness: 20 μm). Herein, the polarizing plate and the λ/4 plate were laminated so that a slow axis of the λ/4 plate might form an angle of 45° in a clockwise direction with respect to an absorption axis of a polarizer of the polarizing plate.

Next, the λ/2 plate with a pattern formed thereon was laminated on the λ/4 plate via an acrylic pressure-sensitive adhesive (thickness: 20 μm) to form a λ/2 layer partially. Herein, the λ/2 layer was formed so that a slow axis of the λ/2 layer might form an angle of 135° in a clockwise direction with respect to the absorption axis of the polarizer of the polarizing plate.

Example 2

A laminated optical film was produced in the same way as in Example 1, except that: the λ/4 plate was laminated so that the slow axis of the λ/4 plate might form an angle of 135° in a clockwise direction with respect to the absorption axis of the polarizer; and the λ/2 layer was formed so that the slow axis of the λ/2 layer might form an angle of 45° in a clockwise direction with respect to the absorption axis of the polarizer.

Example 3

A laminated optical film was produced in the same way as in Example 1, except that: the λ/4 plate was laminated so that the slow axis of the λ/4 plate might form an angle of 45° in a clockwise direction with respect to the absorption axis of the polarizer; and the λ/2 layer was formed so that the slow axis of the λ/2 layer might form an angle of 45° in a clockwise direction with respect to the absorption axis of the polarizer.

Example 4

A laminated optical film was produced in the same way as in Example 1, except that: the λ/4 plate was laminated so that the slow axis of the λ/4 plate might form an angle of 135° in a clockwise direction with respect to the absorption axis of the polarizer; and the λ/2 layer was formed so that the slow axis of the λ/2 layer might form an angle of 135° in a clockwise direction with respect to the absorption axis of the polarizer.

Example 5

A laminated optical film was produced in the same way as in Example 1, except that a circular pattern with a diameter of 4 mm was formed on a λ/2 plate at intervals of 12 mm in longitudinal and horizontal directions each as illustrated in FIG. 3 to form a λ/2 layer.

Example 6

A laminated optical film was produced in the same way as in Example 5, except that: the λ/4 plate was laminated so that the slow axis of the λ/4 plate might form an angle of 135° in a clockwise direction with respect to the absorption axis of the polarizer; and the λ/2 layer was formed so that the slow axis of the λ/2 layer might form an angle of 45° in a clockwise direction with respect to the absorption axis of the polarizer.

Comparative Example 1

A laminated optical film was produced in the same way as in Example 1, except that: the λ/4 plate was laminated so that the slow axis of the λ/4 plate might be parallel to the absorption axis of the polarizer; and the λ/2 layer was formed so that the slow axis of the λ/2 layer might be parallel to the absorption axis of the polarizer.

Comparative Example 2

A laminated optical film was produced in the same way as in Example 1, except that the λ/2 layer was formed so that the slow axis of the λ/2 layer might be parallel to the absorption axis of the polarizer.

Comparative Example 3

A laminated optical film was produced in the same way as in Example 1, except that: the λ/4 plate was laminated so that the slow axis of the λ/4 plate might be parallel to the absorption axis of the polarizer; and the λ/2 layer was formed so that the slow axis of the λ/2 layer might form an angle of 45° in a clockwise direction with respect to the absorption axis of the polarizer.

Comparative Example 4

A laminated optical film was produced in the same way as in Example 1, except that: the λ/4 plate was laminated so that the slow axis of the λ/4 plate might form an angle of 22.5° in a clockwise direction with respect to the absorption axis of the polarizer; and the λ/2 layer was formed so that the slow axis of the λ/2 layer might form an angle of 45° in a clockwise direction with respect to the absorption axis of the polarizer.

Comparative Example 5

A laminated optical film was produced in the same way as in Example 1, except that the λ/2 layer was formed so that the slow axis of the λ/2 layer might form an angle of 22.5° in a clockwise direction with respect to the absorption axis of the polarizer.

The laminated optical films obtained in the respective examples and comparative examples were each attached to a front surface of an LED display apparatus (TECHNO RAINBOW TR2006R produced by Toshiba Corporation), and were evaluated for their image display properties with spectacles shown below.

Table 1 shows evaluation results.

(Polarizing Spectacles)

Polarizing spectacles were produced using a laminated film in which a polarizing plate (SEG5425DU (trade name) produced by Nitto Denko Corporation) and the above-mentioned λ/4 plate were laminated via an acrylic pressure-sensitive adhesive (thickness: 20 μm). Herein, the polarizing plate and the λ/4 plate were laminated so that the slow axis of the λ/4 plate might form an angle of 45° in a clockwise direction with respect to an absorption axis of a polarizer of the polarizing plate in a right-eye region. On the other hand, the polarizing plate and the λ/4 plate were laminated so that the slow axis of the λ/4 plate might form an angle of 135° in a clockwise direction with respect to the absorption axis of the polarizer of the polarizing plate in a left-eye region.

The evaluation results of the display properties shown in Table 1 are as described below.

◎: The recognition of a stereoscopic display was attained at a high contrast.

○: The recognition of a stereoscopic display was attained at a low contrast.

x: No stereoscopic display could be recognized (circularly polarized light was not emitted or circularly polarized light only on one side was emitted).

TABLE 1

| | Axis angle | | | | |
|---|---|---|---|---|---|
| | Absorption axis of polarizer | Slow axis of λ/4 plate | Slow axis of λ/2 layer | Shape of pattern | Display properties |
| Example 1 | 0° | 45° | 135° | Stripe | ◎ |
| Example 2 | 0° | 135° | 45° | Stripe | ◎ |
| Example 3 | 0° | 45° | 45° | Stripe | ○ |
| Example 4 | 0° | 135° | 135° | Stripe | ○ |
| Example 5 | 0° | 45° | 135° | Circular | ◎ |
| Example 6 | 0° | 135° | 45° | Circular | ◎ |
| Comparative Example 1 | 0° | 0° | 0° | Stripe | x |
| Comparative Example 2 | 0° | 45° | 0° | Stripe | x |
| Comparative Example 3 | 0° | 0° | 45° | Stripe | x |
| Comparative Example 4 | 0° | 22.5° | 45° | Stripe | x |
| Comparative Example 5 | 0° | 45° | 22.5° | Stripe | x |

◎: The recognition of a stereoscopic display was attained at a high contrast.
○: The recognition of a stereoscopic display was attained at a low contrast.
x: No stereoscopic display could be recognized (circularly polarized light was not emitted or circularly polarized light only on one side was emitted).

The laminated optical film of the present invention is used preferably in an image display apparatus such as an LED display apparatus.

The invention claimed is:

1. A method of producing a laminated optical film, comprising:
    laminating a polarizing plate and a λ/4 plate; and
    forming a λ/2 layer partially on the λ/4 plate,
    wherein the polarizing plate and the λ/4 plate are laminated so that an angle between an absorption axis of a polarizer of the polarizing plate and a slow axis of the λ/4 plate is substantially 45°, and the λ/2 layer is formed so that an angle between the absorption axis of the polarizer and a slow axis of the λ/2 layer is substantially 45°.

2. A method of producing a laminated optical film according to claim 1, wherein the λ/2 layer is formed by a plurality of λ/2 plates.

3. A method of producing a laminated optical film according to claim 1, wherein the λ/2 layer is formed by a λ/2 plate having a pattern.

4. A method of producing a laminated optical film according to claim 3, wherein the pattern is formed through irradiation of laser light.

5. A method of producing a laminated optical film according to claim 1, wherein the λ/4 plate has an in-plane retardation Δnd of 95 nm to 180 nm, and the λ/2 layer has an in-plane retardation Δnd of 190 nm to 360 nm.

6. A method of producing a laminated optical film according to claim 1, wherein the λ/2 layer is formed in a stripe shape.

7. A method of producing a laminated optical film according to claim 1, wherein a non-covered portion that is not covered with the λ/2 layer is formed in a substantially circular shape.

* * * * *